(12) United States Patent
Devor et al.

(10) Patent No.: US 11,210,940 B2
(45) Date of Patent: Dec. 28, 2021

(54) DETECTION AND DOCUMENTATION OF SPEEDING VIOLATIONS

(71) Applicant: Redflex Traffic Systems Pty Ltd, South Melbourne (AU)

(72) Inventors: Jonathan Devor, Jerusalem (IL); Igal Muchnik, Mevaseret Zion (IL); Elrom Silvera, Kfar Saba (IL); Michael Bensimhoun, Jerusalem (IL)

(73) Assignee: Redflex Traffic Systems Pty Ltd, South Melbourne (AU)

( * ) Notice: Subject to any disclaimer, the term of this patent is extended or adjusted under 35 U.S.C. 154(b) by 80 days.

(21) Appl. No.: 16/546,329

(22) Filed: Aug. 21, 2019

(65) Prior Publication Data

US 2020/0066145 A1 Feb. 27, 2020

(30) Foreign Application Priority Data

Aug. 23, 2018 (GB) ...................................... 1813709

(51) Int. Cl.
*G08G 1/054* (2006.01)
*G06T 7/246* (2017.01)
(Continued)

(52) U.S. Cl.
CPC .......... *G08G 1/054* (2013.01); *G06K 9/00791* (2013.01); *G06T 7/246* (2017.01);
(Continued)

(58) Field of Classification Search
CPC ............ G06K 2209/15; G06K 9/00791; G06T 7/246; G06T 7/62; G06T 7/97; G08G 1/054
See application file for complete search history.

(56) References Cited

U.S. PATENT DOCUMENTS

| 5,651,075 A | 7/1997 | Frazier et al. |
| 5,734,337 A | 3/1998 | Kupersmit |

(Continued)

FOREIGN PATENT DOCUMENTS

| DE | 19772728946 | 1/2019 |
| GB | 2538502 | 11/2016 |

(Continued)

OTHER PUBLICATIONS

International Search Report and Written Opinion in corresponding International Patent Application No. PCT/IL2019/050937, dated Nov. 24, 2019.

*Primary Examiner* — Kenny A Cese
(74) *Attorney, Agent, or Firm* — Dergoslts & Noah LLP; Todd A. Noah

(57) ABSTRACT

Determining that a vehicle is speeding in violation of a speeding regulation. Capture a timed sequence of image frames of the target vehicle at known capture times of the vehicle, identify corresponding images of a license plate of the target vehicle in the image frames, recognize an alphanumeric character of the license plate in the corresponding images of the license plate, measure respective image dimensions of the alphanumeric character; and responsive to a change between the image dimensions of the alphanumeric character, compute a speed of the target vehicle relative to the camera. Font style and font size are stored of one or more standard vehicle license plate.

12 Claims, 6 Drawing Sheets

(51) Int. Cl.
  *G06T 7/00* (2017.01)
  *G06K 9/00* (2006.01)
  *G06T 7/62* (2017.01)
(52) U.S. Cl.
  CPC .................. *G06T 7/62* (2017.01); *G06T 7/97* (2017.01); *G06K 2209/15* (2013.01)

(56) References Cited

U.S. PATENT DOCUMENTS

| | | | |
|---|---|---|---|
| 5,809,161 | A | 9/1998 | Auty et al. |
| 6,690,294 | B1 | 2/2004 | Zierden |
| 2003/0214585 | A1* | 11/2003 | Bakewell ............... G08G 1/054 348/148 |
| 2013/0215273 | A1 | 8/2013 | Kareev et al. |
| 2014/0028840 | A1 | 1/2014 | Zarubin et al. |

FOREIGN PATENT DOCUMENTS

| | | | |
|---|---|---|---|
| JP | 2006329776 A | * | 12/2006 |
| WO | 2005069248 | | 7/2005 |
| WO | 2008027221 | | 3/2008 |

* cited by examiner

DETECTION AND DOCUMENTATION OF SPEEDING VIOLATIONS

BACKGROUND

1. Technical Field

Aspects of the present invention relate to detection and documentation of speeding violations.

2. Description of Related Art

United States Patent publication U.S. Pat. No. 6,690,294 discloses a system for detecting and identifying traffic law violations. U.S. Pat. No. 6,690,294 (column 7, lines 27-34, FIG. 2) discloses a method for determining speed of a target vehicle using the speed of the target vehicle comparing the size of the license plate in the image to a known standard size license plate, or by comparing the relative change in the size of the license plate in successive images.

BRIEF SUMMARY

Various computerized methods and systems are described herein for determining that a vehicle is speeding in violation of a speeding regulation. The system includes a camera connectable to a processor. The system is operable to: capture a timed sequence of image frames of the target vehicle at known capture times of the vehicle, identify corresponding images of a license plate of the target vehicle in the image frames, recognize an alphanumeric character of the license plate in the corresponding images of the license plate, measure respective image dimensions of the alphanumeric character in the corresponding images of the license plate; and responsive to a change between the image dimensions of the alphanumeric character in the corresponding images of the license plate, compute a speed of the target vehicle relative to the camera. The system may previously store a font style and font size of one or more standard vehicle license plate. The real-space dimensions of multiple alphanumeric characters embossed on the standard vehicle license plate are known.

The system may determine from the images of the license plate of which standard, of the standard vehicle license plates, is the license plate mounted on the target vehicle. The system may recognize an imaged alphanumeric character by correlating with the previously stored font style. The system may compare an image dimension of an alphanumeric character in the image frames to the corresponding real space dimension, to compute a distance from the camera to the license plate of the target vehicle. The system may compare an image dimension of multiple alphanumeric characters in the image frames to the corresponding real space dimensions and compute therefrom a distance from the camera to the license plate of the target vehicle and an angular orientation of the license plate of the target vehicle relative to the camera. The system is mountable on a host vehicle. Speed of the target vehicle may be determined relative to ego-motion of the host vehicle. Ego-motion of the host vehicle may be determined by optical flow in the image frames and/or a signal from a sensor mounted in the host vehicle and connected to the processor. The sensor may be a CAN bus, a global positioning system (GPS) receiver, a yaw sensor, an accelerometer, a distance sensor, a LIDAR and/or a gyroscope.

Various computerized methods and systems are described herein for determining distance to a target vehicle in a road environment. The system includes a camera connected to a processor. The system is operable to: capture a timed sequence of image frames of the target vehicle at known capture times of the vehicle, identify corresponding images of a license plate of the target vehicle in the image frames, recognize an imaged alphanumeric character of the license plate in the corresponding images of the license plate, and previously store a font style and font size of a standard vehicle license plate. The real-space dimensions of multiple alphanumeric characters embossed on the standard vehicle license plate are known. The system is operable to determine from the images of the license plate of which standard, of the standard vehicle license plates, is the license plate mounted on the target vehicle. The system is operable to recognize the imaged alphanumeric character by correlating with the previously stored font style and to compare an image dimension of the alphanumeric character in the image frames to the corresponding real space dimension to compute a distance from the camera to the license plate of the target vehicle.

The system may compare an image dimension of a multiple alphanumeric characters of the license plate in the image frames to the corresponding real space dimensions and computing therefrom a distance from the camera to the license plate of the target vehicle and an angular orientation of the license plate of the target vehicle relative to the camera. The system may be mounted on a host vehicle, and may compute speed of the target vehicle relative to known ego-motion of the host vehicle. Ego-motion of the host vehicle may be determined by optical flow in the image frames and/or a signal from a sensor mounted in the host vehicle and connected to the processor. The sensor may be a CAN bus, a global positioning system (GPS) receiver, a yaw sensor, an accelerometer, a distance sensor, a LIDAR and/or a gyroscope.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

The invention is herein described, by way of example only, with reference to the accompanying drawings, wherein.

DETAILED DESCRIPTION

Figure 1:
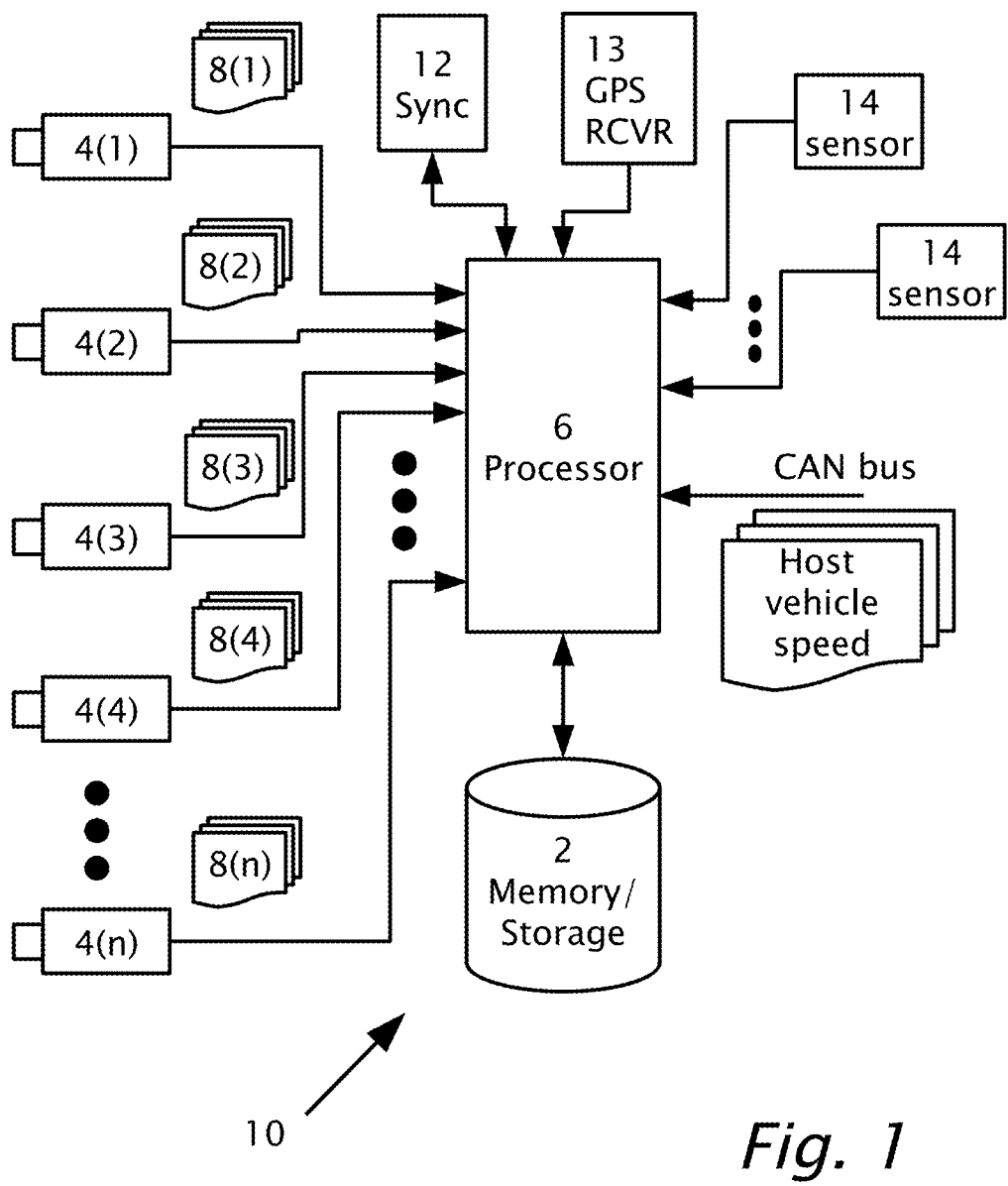
FIG. 1 illustrates a diagram of a system mountable in a host law enforcement vehicle, according to features of the present invention.

The foregoing and/or other aspects will become apparent from the following detailed description when considered in conjunction with the accompanying drawing figures.

Reference will now be made in detail to features of the present invention, examples of which are illustrated in the accompanying drawings, wherein like reference numerals refer to the like elements throughout. The features are described below to explain the present invention by referring to the figures.

By way of introduction, various embodiments of the present invention are directed to provide sufficient evidence to enforce existing speeding regulations. High accuracy measurements of distance to a target vehicle and speed of a target vehicle are critical for police law enforcement. In many jurisdictions, there is a legal requirement for very high-accuracy speed measurements for the detection to be actionable, typically up to a few percent. It was found empirically that use of standard license plate dimension may be unreliable for law enforcement. Unreliability using license plate dimension or license plate area may result from different background colours, shadow over the top edge of the licensing plate and/or license plate holders which partially mask an edge of the license plate. Features of the present invention include character recognition of license plate characters of known font and dimension in order to determine distance and/or speed.

Referring now to the drawings, reference is now made to FIG. 1 which shows a diagram of a system 10, according to features of the present invention. Processor 6 is operatively connected to a memory or storage 2. Processor 6 captures image frames 8(1) to 8(n) from respective cameras 4(1) to 4(n). Capture times may be stored as time stamps which record when image frames are captured. A global positioning system (GPS) receiver 13 may provide geographical co-ordinates of system 10 to processor 6. Multiple sensor inputs to processor 6 are provided from sensors 14. Various sensors 14 may be included in system 10 including a gyroscope for measuring orientation, an accelerometer for measuring non-gravitational acceleration, a yaw sensor which measures a yaw angle of host vehicle 20, and/or a sensor 14 for measuring distance to an object. Distance sensor 14 may utilize laser imaging/detection and ranging (LIDAR) or ultrasonic techniques known in the art of distance sensing. A synchronization unit 12 may include a hardware circuit including a real time clock and trigger circuits which trigger the capture of the image frames 8(1) to 8(n) from the respective cameras 4(1) to 4(n) at known real times. Synchronization unit 12 may be used to synchronize the capture of the multiple image frames 8(1) to 8(n) from the respective cameras 4(1) to 4(n). Alternatively, real time clock and trigger circuits may be incorporated into processor 6 and synchronization is performed by processor 6. Processor 6 may be connected to CAN bus of host vehicle 20, and may receive in real time, speed data of host vehicle.

Figure 2A:
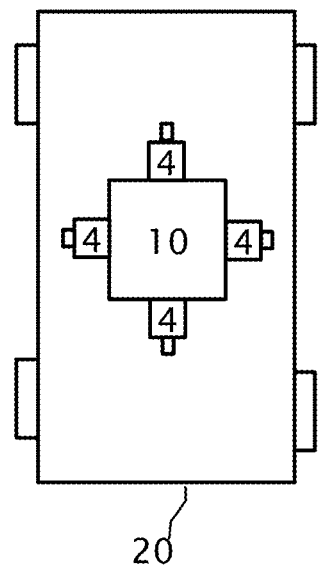
FIGS. 2A, 2B and 2C which illustrates various systems as in FIG. 1 mounted on the host vehicle, according to different camera configurations.
Figure 2B:
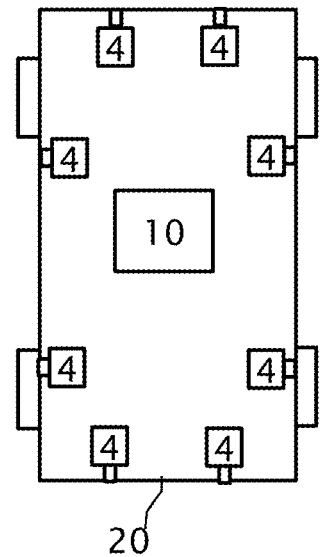
Figure 2C:
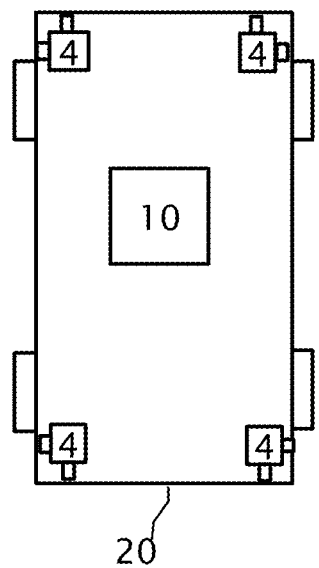

Reference is now also made to FIGS. 2A, 2B and 2C which illustrates system 10 mounted on host vehicle 20, according to different configurations of the present invention. In the description that follows, cameras 4(1) to 4(n) may be mounted on the exterior of host vehicle 20 or in the interior of host vehicle 20 behind a window of host vehicle 20. FIG. 2A shows four cameras 4(1) to 4(4) mounted on a frame. The frame may be mounted on the exterior of the roof of host vehicle or on the roof in the interior of host vehicle 20.

FIG. 2B shows eight cameras 4(1) ... 4(8) mounted at on host vehicle 20. Two cameras 4 face forward, two cameras 4 face rearwards, two cameras 4 face leftwards and two cameras 4 face rightwards. Forward viewing cameras 4, rearward viewing cameras, left viewing cameras 4 and right viewing cameras may be stereo cameras.

FIG. 2C shows eight cameras 4(1) ... 4(8) mounted at four corners of host vehicle 20. Each corner includes two cameras 4 with the optical axis of each camera 4 at substantially ninety degrees to each other in a substantially horizontal plane. The configuration of FIG. 2C may collocate two cameras in the same housing and may simplify installation and calibration compared with the configuration of eight cameras 4(1) ... 4(8) as shown as FIG. 2B.

Various examples of camera configurations are shown in FIGS. 2A-2C. Any number n of cameras 4, any type of cameras 4, field of views of cameras 4 and positions to mount cameras 4 may be chosen according to various aspects of the present invention.

One or more cameras 4 may be installed in an unmarked law enforcement vehicle and may be used to provide evidence with respect to a speeding infraction. Cameras 4 may be configured to be always capturing image frames 8(1) to 8(n) or cameras 4 may be signaled by the law enforcement officer to capture image frames 8(1) to 8(n). The processing of the image frames 8(1) to 8(n) to determine if a speeding infraction has occurred may be performed by post-processing, for instance when the law enforcement officer has returned to the police station. The processing of the image frames may involve multiple cameras 4. For instance, a speeding infraction may be captured with a rear viewing camera 4 and then with a side-viewing camera 4 and then with a forward viewing camera 4 as the two vehicles involved pass the law enforcement vehicle. Cameras 4 may be synchronized so that the time differences between any image frames 8 of any of cameras 4 are known. Moreover. the relative orientations and positions of cameras 4 mounted in host vehicle 20 are known so that world space coordinates of corresponding object points captured synchronously in different image frames 8 from different cameras 4 may be calibrated and positions of objects in world space may be continuously determined from image frames 8 as viewed from camera 4 to another camera 4.

Figure 3:
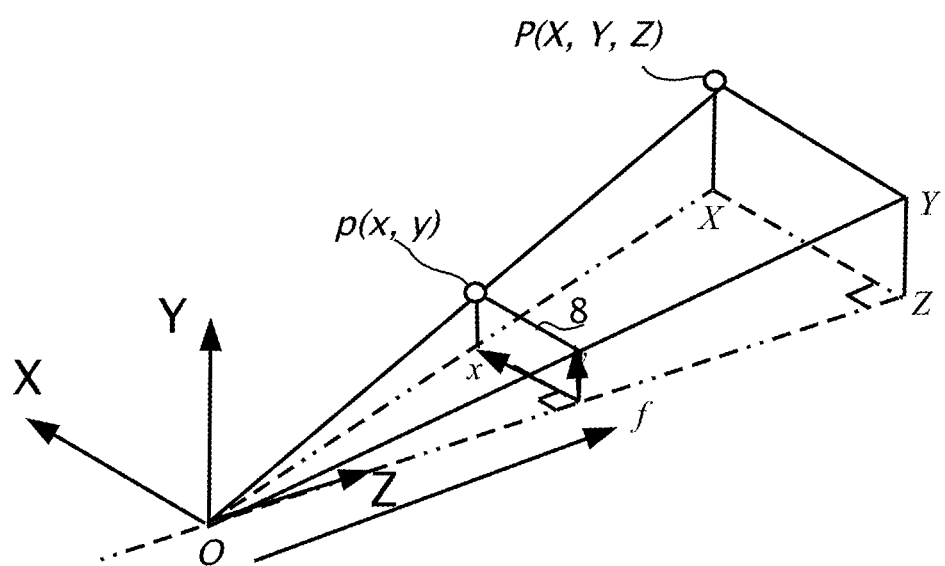
FIG. 3 illustrates camera or pinhole projection which relates a point P(X,Y,Z) in world space Cartesian coordinates to a point p(x,y) in image coordinates on an image plane.

Reference is now made to FIG. 3 which illustrates camera or pinhole projection which relates a point P(X,Y,Z) in world space Cartesian coordinates to a point p(x,y) image coordinates on image plane 8 where X is the horizontal Cartesian coordinate in world space, Y is the vertical Cartesian coordinate in world space and Z is the direction along the optical axis of the camera. The origin O of camera projection is at the pinhole, image plane 8 is in reality is behind the origin at focal length f with the image inverted. Image plane 8 is shown in the projection of FIG. 3 in a symmetric position with a non-inverted image in front of origin O at a distance focal length f. The following equations approximate the relation between image coordinates x,y and world space coordinates X,Y,Z assuming camera or pinhole projection.

$$x = f\frac{X}{Z} \quad (1)$$

$$y = f\frac{Y}{Z} \quad (2)$$

Figure 4:
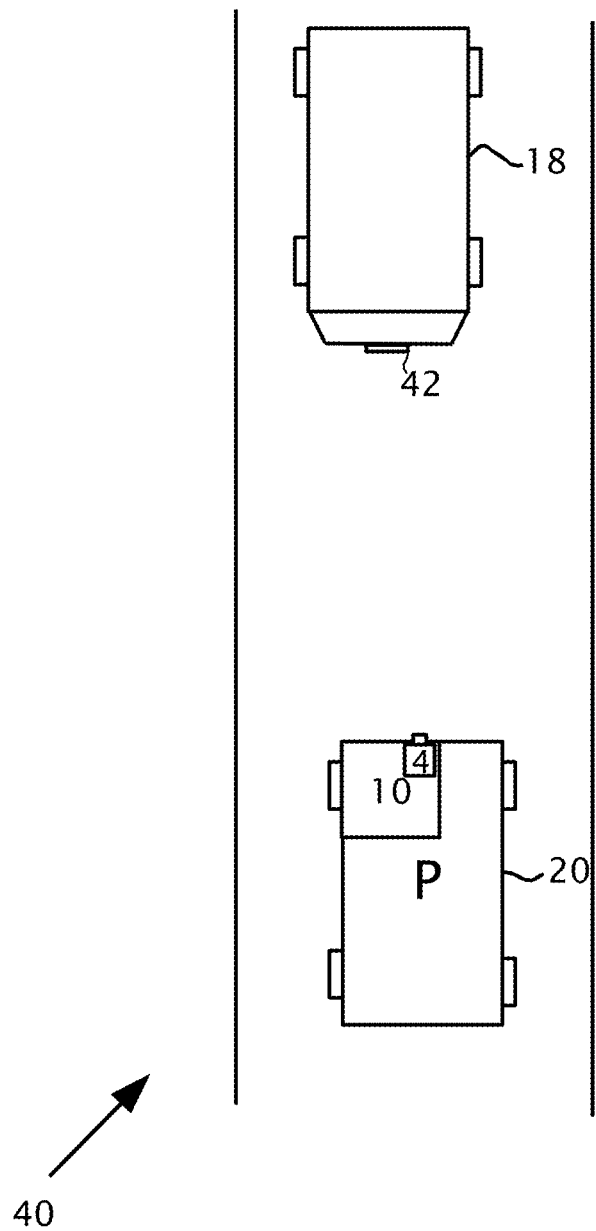
FIG. 4 illustrates a road scenario while using a system according to an aspect of the present invention for providing evidence with respect to a speeding and/or lack of maintaining distance violation.

Reference is now made to FIG. 4, which illustrates a road scenario 40 while using system 10, according to an aspect of the present invention for providing evidence with respect to a speeding violation. A lane of traffic is shown. Host vehicle, e.g. a law enforcement vehicle 20 is equipped with system 10 including a forward viewing camera 4 viewing traffic moving ahead of host vehicle 20 in the lane of traffic. A target vehicle 18 is shown in the lane ahead of host vehicle 20. Rear license plate 42 is in field of view of camera 4.

Figure 5:
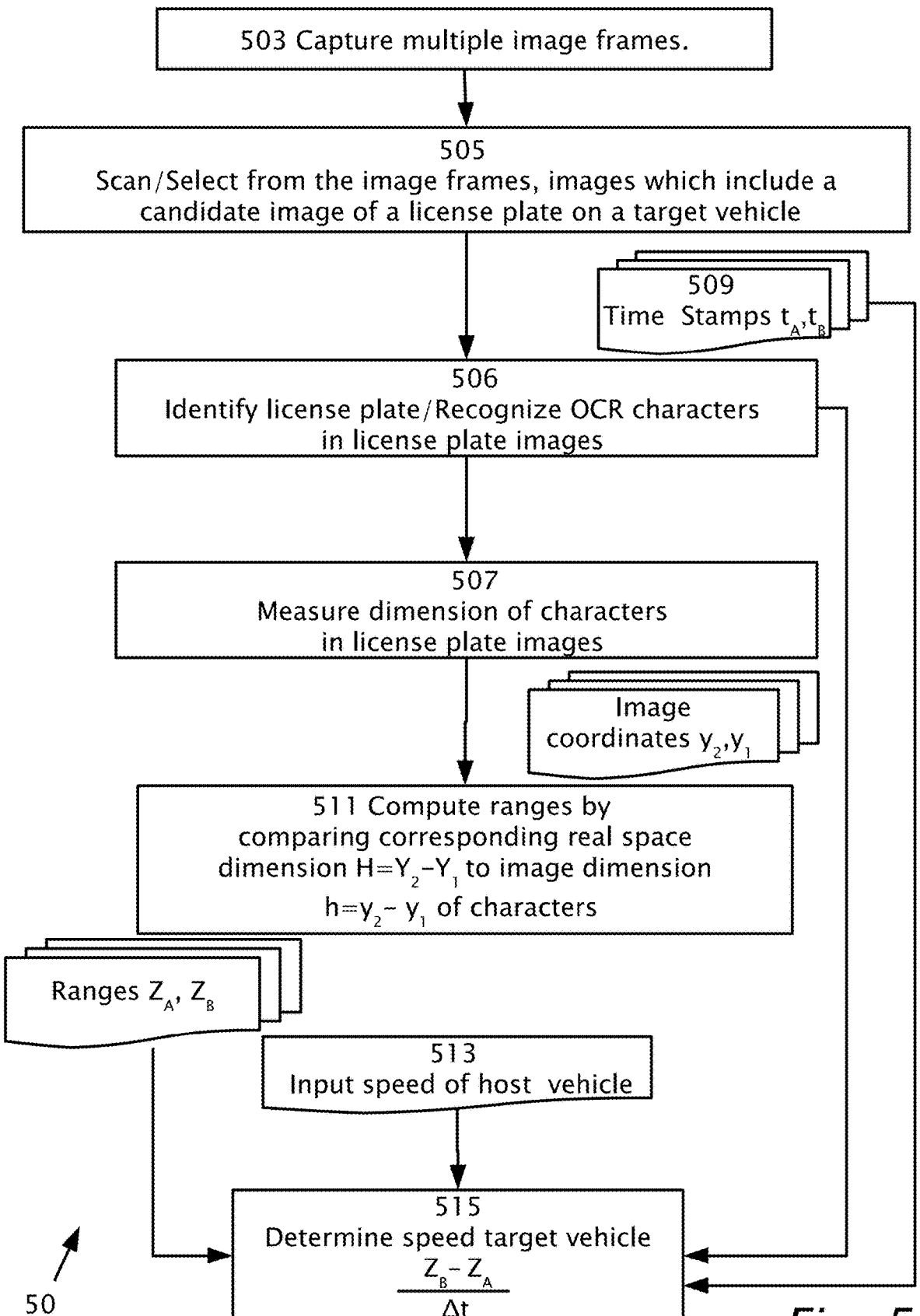
FIG. 5 includes a flow diagram generally illustrating a method according to features of the present invention.

Reference is now also made to FIG. 5 which includes a flow diagram illustrating a method 50 according to features of the present invention. In step 503, multiple image frames are captured using camera 4, as shown in FIG. 4, for example. Images are scanned and selected (step 505) for rectangular objects that are likely to be images of license plates. Selection (step 505) is preferably sufficiently liberal so as to not miss distorted license plates, with real world imperfections such as plate bend, dirt and/or rust; not to miss image frames 8 that include a partially obstructed image of a license plate; not to miss license plate images with optical imperfections due to non-uniform lighting, e.g. partial shadow and not to miss images with keystone distortion from viewing away from the camera optical axis. However, selection (step 505) should be stringent enough so as not to include many false-positive license plate identifications. Time stamps 509 are stored which represent the capture times tA, tB, . . . of the selected image frames. In step 506, license plates are positively identified and optical character recognition is performed to identify individual alphanumeric characters. In step 507, dimension(s) of the characters in the license plate images are measured.

Figure 6:
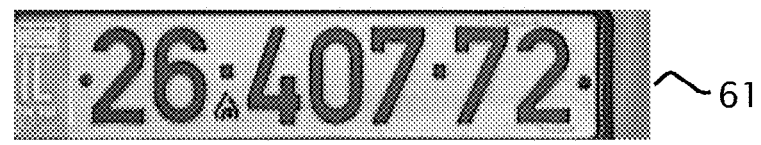
FIG. 6 shows images of a license plate and further image processing steps which may be performed on license plate images, according to features of the present invention
Figure 6:
Figure 6:
Figure 6:

Reference is now made also to FIG. 6 which illustrates further image processing steps which may be performed on license plate images, according to features of the present invention. License plate image 61 illustrates a gray-scale license plate image cropped out of an image frame 8. A threshold of gray-scale is selected and the resulting license plate image 63 is a binary, i.e. black/white, image using the selected threshold. Optical character recognition (step 506) is performed and image features which are not characters are removed in image 65. Referring now back to FIG. 5, step 507, measurement of character heights is shown by vertical lines in image 65. Image coordinates y2 and y1 are shown labelled on the first character "2" in license plate image 65. Image 67 (FIG. 6) illustrates the vertical lines showing character height in image 65, superimposed on the original grey scale image 61 of the license plate.

Optical character recognition (step 506) may be aided by comparing/correlating imaged characters with known fonts of standard alphanumeric characters used for license plates in a particular jurisdiction. Most jurisdictions have a few standard license plates each with different license plate dimensions and different character font. While the imaged width of license plate characters may vary significantly due to yaw or steering direction of the target vehicle relative to the camera optical axis, the imaged heights are relatively constant. Overall dimensions of the license plate and/or dimensions of the characters, (e.g. width to height ratio) may be used to determine which standard of license plate is imaged. The true real space height of recognized character of the standard font may be determined from a look-up table.

Still referring to FIG. 5, in step 507, height of imaged characters may be measured as:

$$h = y_2 - y_1 \quad (3)$$

where $y_2$ and $y_1$ are vertical horizontal image coordinates and h is the measured height of the character in image space. World space height of the characters of the license plate is:

$$H = Y_2 - Y_1 \quad (4)$$

By calculating the ratio of the observed height to the true height, the distance Z between the camera and a point on the license plate may be computed:

$$Z = \frac{f \cdot H}{h} \quad (5)$$

where f is the focal length of the camera.

With use of equations (1) and (2), and range Z the world space coordinates (X,Y) of the license plate may also be estimated.

Calculation of Relative Speed

For a host vehicle 20 which is not moving, or moving in the same direction as target vehicle 18 then the speed s of target vehicle 18 may be determined relative to the speed of host vehicle from equation (5):

$$s = \frac{Z_B - Z_A}{t_B - t_A} \quad (6)$$

where subscripts A and B refer to different image frames captured at times tB and tA respectively.

Using equations (5) and (6), relative speed s between the target vehicle and the host vehicle may be computed by:

$$s = \frac{f \cdot H}{t_B - t_A} \cdot \left( \frac{1}{h_B} - \frac{1}{h_A} \right) \quad (7)$$

where $h_B$ and $h_A$ are the measured heights of the alphanumeric characters of the license plate 42.

Angular Refinement

In practice, license plate 42 is not generally facing camera 4 with the normal to license plate 42 collinear with the optical axis of camera 4. Characters which are more distant from camera 4 appear smaller in image frames 8, while characters which are closer to camera 4 appear larger. A "keystone" distortion results which causes observed dimensions of the characters to vary, as well as the distances separating the characters. These data may be used to estimate angular orientation of license plate 42 and to refine the distance and speed computation from equations (5)-(7). Specifically, observed heights of license plate characters are relatively invariant with changes in yaw (steering angle) of target vehicle 18 and observed widths of license plate characters are relatively invariant with changes in pitch angle of target vehicle 18, caused by speed bumps, for instance. Therefore, simultaneously fitting or otherwise analytically or numerically combining observed character dimensions, e.g. length and width allows computation of a refined distance to the license plate of the target vehicle 18 as well as orientation of the license plate 42 relative to camera 4 mounted in host vehicle 20.

The term "capture times" as used herein refers times relative to an initial time which may be a time of capture of a first image frame of a series of image frames and/or capture times may refer to real time in calendar year, month, day, hours and/or seconds. The term "synchronize" as used herein or "synchronous" with reference to different cameras refer to arranging the capture times so the time intervals between time stamps of different captured image frames from different cameras are known.

The term "corresponding" as used herein refers to an image point associated with an object point. The term "corresponding as used herein in the context of stereo or overlapping fields of view of multiple cameras with synchronized capture, refers to multiple image points of the same object point captured at the same time.

The term "range" as used herein refers to the Cartesian world space coordinate usually parallel to the optical axis of a camera and usually denoted as Z.

The term "relative to a camera" as used herein refers generally to the origin in the pinhole camera projection (shown in FIG. 3) or a relative to a ray emanating from the origin.

The term "ego-motion" as used herein refers to a measurement or estimate of three dimensional of a camera within the environment, such as a camera mounted on a host vehicle in a road environment.

The term "LIDAR" as used herein refers to a sensor which measures distance to a target by illuminating the target with pulsed laser light and measuring time-of-flight of the reflected pulses.

The term "ground speed" as used herein refers to speed of a target vehicle relative to the ground.

The term "alphanumeric" as used herein refers to a combination of alphabetic and numeric characters and generally the characters embossed/printed in a vehicle license plate.

The term "CAN bus" as used herein refers to a Controller Area Network (CAN bus) which is a robust vehicle bus standard with a message based protocol designed to allow devices to communicate with each other in a motor vehicle.

The indefinite articles "a", "an" is used herein, such as "a camera", "a character" have the meaning of "one or more" that is "one or more cameras" or "one or more characters".

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

Although selected features of the present invention have been shown and described, it is to be understood the present invention is not limited to the described features.

What is claimed is:

1. A computerized method for determining that a target vehicle is speeding in violation of a speeding regulation, the method using a system mountable in a host vehicle, the system including a camera operatively connected to a processor, the method comprising:
    previously storing a font style and font size of at least one standard vehicle license plate, wherein real-space dimensions of a plurality of alphanumeric characters embossed on the at least one standard vehicle license plate are known;
    capturing a timed sequence of image frames of the target vehicle at known capture times;
    identifying corresponding images of a license plate of the target vehicle in the image frames;
    recognizing an imaged alphanumeric character of the license plate in the corresponding images of the license plate;
    measuring respective image dimensions, height and width of the alphanumeric character in the corresponding images of the license plate;
    simultaneously fitting the image dimensions, the height and the width, of the plurality of the alphanumeric characters responsive to the real-space dimensions, thereby computing a refined distance from the camera to the license plate of the target vehicle and an angular orientation of the license plate relative to the camera; and
    responsive to the refined distance from the camera to the license plate of the target vehicle and the angular orientation of the license plate relative to the camera mounted in the host vehicle, computing a speed of the target vehicle relative to the camera.

2. The computerized method of claim 1, further comprising:
    previously storing a font style and font size of a plurality of standard vehicle license plates;
    determining from the images of the license plate of which standard of the standard vehicle license plates is the license plate mounted on the target vehicle.

3. The computerized method of claim 2, further comprising:
    said recognizing an imaged alphanumeric character by correlating with the previously stored font style.

4. The computerized method of claim 1, further comprising:
    comparing an image dimension of an alphanumeric character in the image frames to the corresponding real space dimension, thereby computing a distance from the camera to the license plate of the target vehicle.

5. The computerized method of claim 1, the method further comprising:
    said computing speed of the target vehicle relative to known ego-motion of the host vehicle and determining therefrom a ground speed of the target vehicle.

6. The computerized method of claim 5, further comprising:
    determining ego-motion of the host vehicle by at least one of: optical flow in the image frames, and a signal from at least one sensor mounted in the host vehicle and connected to the processor, the at least one sensor selected from the group consisting of: a CAN bus, a global positioning system (GPS) receiver, a yaw sensor, an accelerometer, a distance sensor, a LIDAR and a gyroscope.

7. A system for determining that a vehicle is speeding in violation of a speeding regulation using a camera connectable to a processor, wherein the system is mountable in a host vehicle, the system operable to:
    previously store a font style and font size of at least one standard vehicle license plate, wherein real-space dimensions of a plurality of alphanumeric characters embossed on the at least one standard vehicle license plate are known;
    capture a timed sequence of image frames of the target vehicle at known capture times;
    identify corresponding images of a license plate of the target vehicle in the image frames;
    recognize an alphanumeric character of the license plate in the corresponding images of the license plate;
    measure respective image dimensions of the alphanumeric character in the corresponding images of the license plate;
    simultaneously fit the image dimensions height and width, of the plurality of the alphanumeric characters responsive to the real-space dimensions, thereby computing a refined distance from the camera to the license plate of the target vehicle and an angular orientation of the license plate relative to the camera; and responsive to the refined distance from the camera to the license plate of the target vehicle and the angular orientation of the license plate relative to the camera mounted in the host vehicle, computing a speed of the target vehicle relative to the camera.

8. The system of claim 7, further operable to:
previously store a font style and font size of a plurality of standard vehicle license plates;
determine from the images of the license plate of which standard of the standard vehicle license plates is the license plate mounted on the target vehicle.

9. The system of claim 7, further operable to:
recognize an imaged alphanumeric character by correlating with the previously stored font style.

10. The system of claim 7, further operable to:
compare an image dimension of an alphanumeric character in the image frames to the corresponding real space dimension, to compute a distance from the camera to the license plate of the target vehicle.

11. The system of claim 7, wherein a ground speed of the target vehicle is determined by computing speed of the target vehicle relative to ego-motion of the host vehicle.

12. The system of claim 11, wherein ego-motion of the host vehicle is determined by at least one of: optical flow in the image frames, and a signal from at least one sensor mounted in the host vehicle and connected to the processor, the at least one sensor selected from the group consisting of: a CAN bus, a global positioning system (GPS) receiver, a yaw sensor, an accelerometer, a distance sensor, a LIDAR and a gyroscope.

* * * * *